(12) United States Patent
Byoun

(10) Patent No.: US 6,276,655 B1
(45) Date of Patent: Aug. 21, 2001

(54) FLAT PANEL DISPLAY DEVICE

(75) Inventor: Dae-hyoun Byoun, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/208,432

(22) Filed: Dec. 10, 1998

(30) Foreign Application Priority Data

Dec. 12, 1997 (KR) .......................................... 97-36962 U

(51) Int. Cl.[7] .................................................. A47G 29/00
(52) U.S. Cl. .......................................... 248/923; 361/681
(58) Field of Search .................................. 248/919, 920, 248/921, 922, 923, 924, 371; 361/686, 681, 683, 682; 348/836, 839; 312/7.2, 223.2

(56) References Cited

U.S. PATENT DOCUMENTS

| | | | | |
|---|---|---|---|---|
| 4,304,385 | * | 12/1981 | Farouche et al. ............. | 248/920 |
| 4,365,561 | * | 12/1982 | Tellier et al. ................. | 248/920 |
| 4,591,120 | * | 5/1986 | Bryant-Jeffries et al. ..... | 248/921 |
| 4,989,813 | * | 2/1991 | Kim et al. ..................... | 248/920 |
| 5,052,078 | * | 10/1991 | Hosoi ............................ | 361/681 |
| 5,075,929 | * | 12/1991 | Chung ........................... | 361/681 |
| 5,394,297 | * | 2/1995 | Toedter ......................... | 681/683 |
| 5,398,903 | * | 3/1995 | Cho .............................. | 248/921 |
| 5,518,216 | * | 5/1996 | Wu ............................... | 248/921 |
| 5,603,478 | * | 2/1997 | Wang ............................ | 248/923 |
| 5,687,944 | * | 11/1997 | Shon ............................ | 248/919 |
| 5,694,291 | * | 12/1997 | Feightner ..................... | 361/686 |
| 5,732,922 | * | 3/1998 | Jeon ............................. | 248/921 |
| 5,751,548 | * | 5/1998 | Hall et al. ..................... | 361/686 |
| 5,870,280 | * | 2/1999 | Cho .............................. | 248/921 |
| 5,904,328 | * | 5/1999 | Leveridge et al. ............. | 248/919 |
| 5,923,528 | * | 7/1999 | Lee .............................. | 248/921 |
| 5,938,163 | * | 8/1999 | Gotham, Sr. et al. ......... | 248/919 |
| 5,947,440 | * | 9/1999 | Cho .............................. | 248/919 |
| 5,971,268 | * | 10/1999 | Lynch et al. .................. | 248/923 |
| 5,978,211 | * | 11/1999 | Hong ............................ | 361/683 |
| 6,024,335 | * | 2/2000 | Min .............................. | 248/921 |
| 6,032,918 | * | 3/2000 | Cho .............................. | 248/923 |
| 6,068,227 | * | 5/2000 | Morgan et al. ................ | 248/923 |
| 6,081,420 | * | 6/2000 | Kim et al. ..................... | 361/681 |

* cited by examiner

Primary Examiner—Ramon O. Ramirez
Assistant Examiner—Jon A Szumny
(74) Attorney, Agent, or Firm—Staas & Halsey LLP

(57) ABSTRACT

A flat panel display device having a reinforcing member to reinforce a connecting strength between a display unit and a hinge member. The display unit has a front case, a rear case, and a flat panel displaying an image, and is supported by a stand having a circular recess provided at a top portion thereof. The hinge member has tilting shafts, rotating brackets secured to a lower portion of an inner surface of a rear case of the display unit and pivotable about the tilting shafts as a center of rotation respectively, and a circular body fitted in the circular recess and rotated in a range of a certain predetermined angle therein. The reinforcing member is secured to the inner surface of the rear case along with the rotating brackets by fasteners such as screws.

23 Claims, 5 Drawing Sheets

FLAT PANEL DISPLAY DEVICE

CROSS-REFERENCE TO RELATED APPLICATION

This application makes reference to, incorporates the same herein, and claims all benefits accruing under 35 U.S.C. '119 from my utility model application entitled Device for Flat Panel Display Device Compensating Hinge Joint Unit filed with the Korean Industrial Property Office on Dec. 12, 1997 and duly assigned Serial No. 97-36962 by that Office.

BACKGROUND OF THE INVENTION

1. Field of the Invention

The present invention relates to a flat panel display device, and more particularly, relates to a flat panel display device having a reinforcing member for reinforcing a connecting strength between a display unit and a hinge member which pivotally connects the display unit to a stand, enabling the visual angle of the display unit to be adjusted to a position according to the wishes of a user so that user can see data displayed on the flat panel of the display unit well.

2. Description of the Related Art

As shown in FIG. 1, generally, a flat panel display device includes a display unit 1 having a flat panel 2 and a stand 3 for rotatably supporting the display unit 1. The display unit 1 is pivotally connected to the stand 3 by a hinge member 4, so that the visual angle of the display unit 1 can be adjusted backwardly and forwardly, and right and left, if desirable, as shown in FIG. 1.

The hinge member 4 is connected to the display unit I through rotating brackets 6 which are pivoted around a tilting shaft 5 as a center, in accordance with the backward or forward pivot motion of the display unit 1. The flat panel 2 is attached to a front case 1a of the display unit 1, and a rear case 1b of the display unit 1. The rotating brackets 6 are connected to the rear case 1b of the display unit 1. The rotating brackets 6 are made from metallic materials, the rear case 1b of the display unit 1 is formed by molding plastic materials and the bosses 1c are made from plastic materials.

The rotating brackets 6 for connecting the hinge member 4 with the display unit 1 are mounted to a plurality of bosses 1c formed at an inner surface of the rear case 1b by means of screws 7. A portion of the hinge member 4 which is connected to the display unit 1 cannot be shown in front to enhance the external appearance of the display unit 1.

However, in the conventional flat panel display device, a force is concentrated upon the bosses 1c to which the rotating brackets 6 are secured, when the display unit 1 is pivoted for adjusting the visual angle thereof. If the force acts on the bosses 1c repetitively, the screws 7 may be released from the bosses 1c and in turn the rotating brackets 6 may become separated from the rear case 1b, or the bosses 1c made from the plastic materials may be destroyed by the repetitive force, so that a bit of play occurs between the bosses 1c and the screws 7. As a result, the visual angle of the display unit 1 cannot easily and accurately be adjusted due to the play when the display unit 1 is used over the long term.

SUMMARY OF THE INVENTION

Accordingly, it is an object of the present invention to provide a flat panel display device having an endurance which can be enhanced by reinforcing a connecting strength between a display unit and a hinge member.

Additional objects and advantages of the invention will be set forth in part in the description which follows and, in part, will be obvious from the description, or may be learned by practice of the invention.

The above and other objects of the present invention can be attained by providing a flat panel display device which includes a display unit having a front case, a rear case, and a flat panel displaying an image; a stand to support the display unit and having a circular recess provided at a top portion thereof; a hinge member having a tilting shaft, a rotating bracket secured to a lower portion of an inner surface of the rear case of the display unit and pivotable around the tilting shaft as a center of rotation, and a circular body fitted in the circular recess and rotatable in a range of a certain angle; and a reinforcing member secured to the inner surface of the rear case along with the rotating bracket by fasteners.

Also, the circular body has a plurality of protrusions formed at an outer circumference thereof, the circular recess has a plurality of grooves formed at an inner circumference thereof, the protrusions are engaged with the grooves, respectively, and the length of the protrusions is shorter than that of the grooves.

The rotating brackets are secured to the inner surface of the rear case by the fasteners. The reinforcing member preferably has a width and a length shorter than those of a lower side of the rear case.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
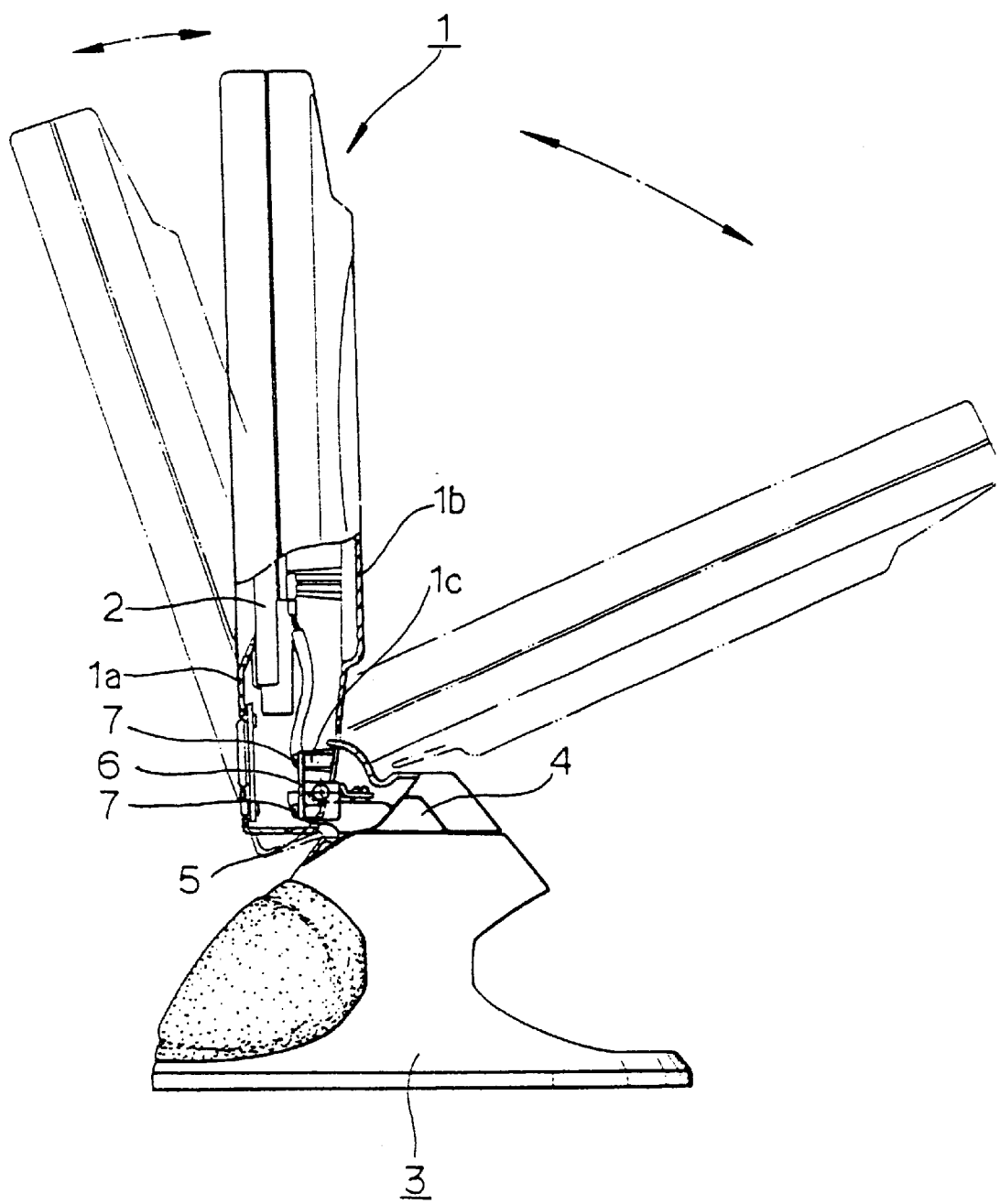
FIG. 1 is a side view showing a flat panel display device including a hinge connecting part according to the conventional art.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
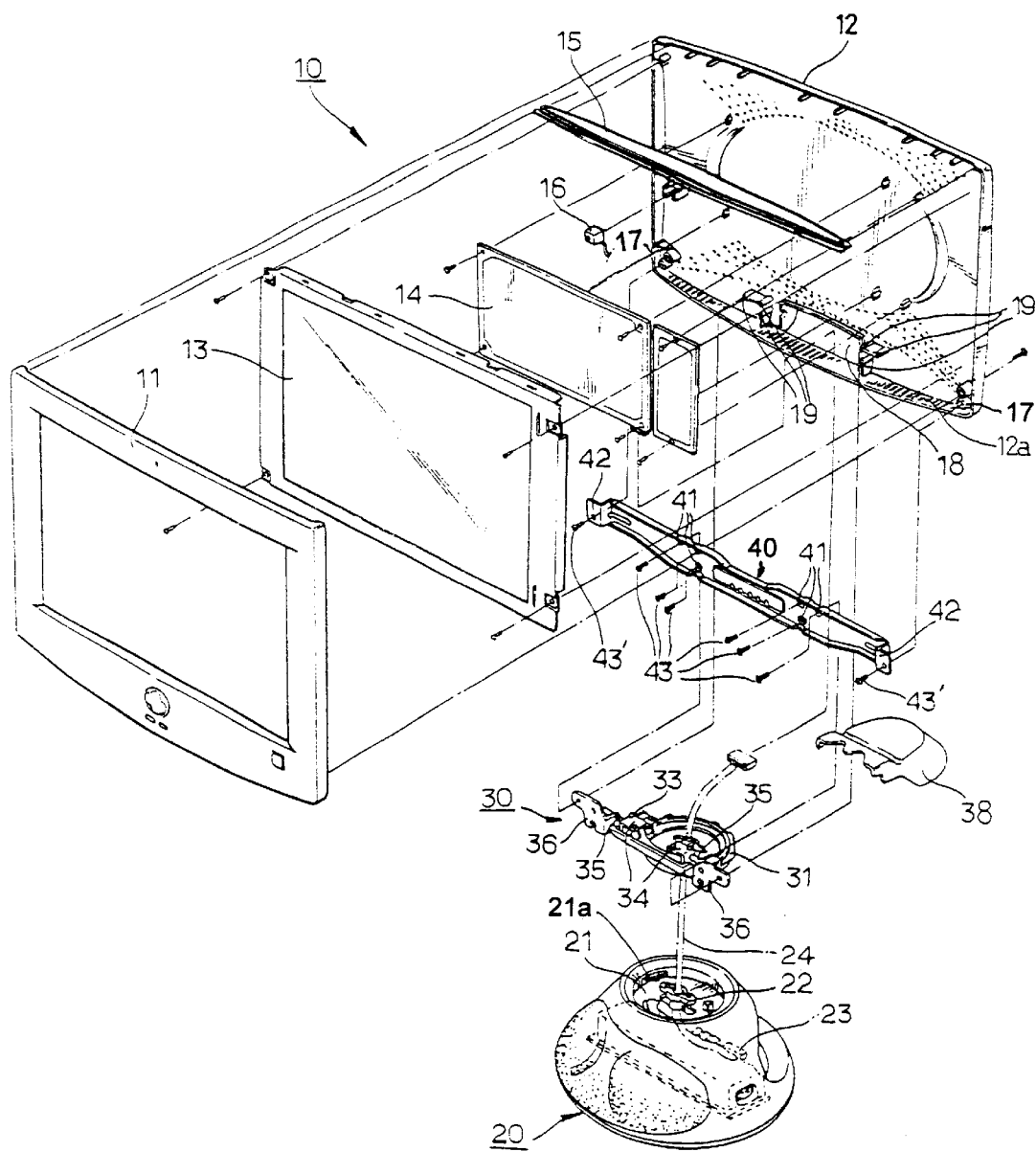
FIG. 2 is an exploded perspective view of a flat panel display device according to an embodiment of the present invention.
Figure 3:
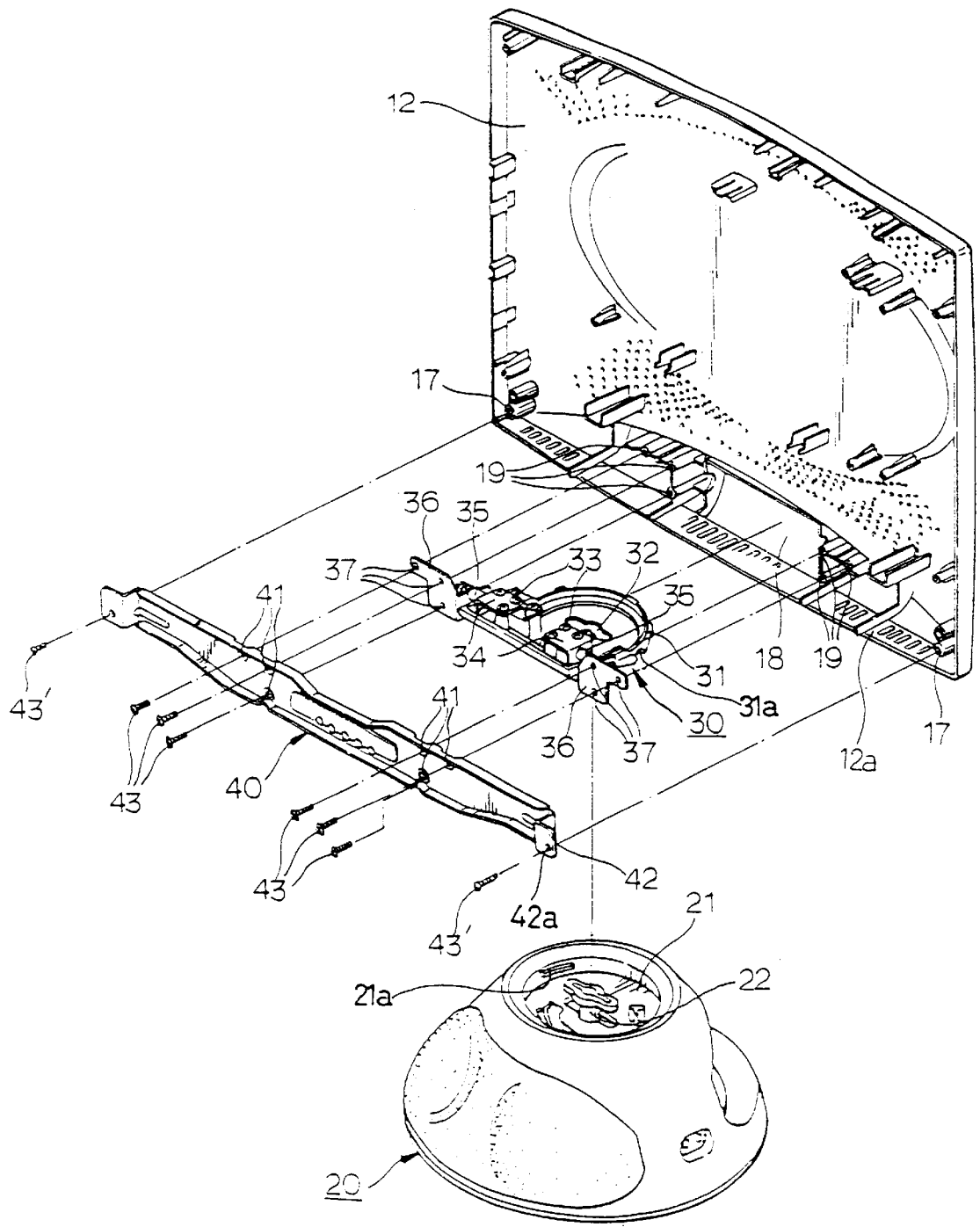
FIG. 3 is an enlarged and exploded perspective view of particular parts of the flat panel display device according to the embodiment of the present invention.

FIG. 2 through FIG. 5 show a flat panel display device according to an embodiment of the present invention. Referring to FIG. 2 and FIG. 3, the flat panel display device includes a display unit 10, a stand 20 supporting the display unit 10, a hinge member 30 secured to the display unit 10 and rotatably connected to the stand 20 to adjust the orientation and visual angle of the display unit 10, and a reinforcing member 40 reinforcing a connecting strength between the display unit 10 and the hinge member 30.

The display unit 10 is equipped with a front case 11 and a rear case 12 having a plurality of bosses 17 and 19 which extend toward the front case 11, and a flat panel 13 which is mounted to an inner surface of the rear case 12 by a plurality of fasteners such as screws, in the assembling process. Also, in the rear case 12, circuit boards 14, a color band 15, and a mike 16 are mounted.

The stand 20 has a circular recess 21 provided at a top portion thereof, and a swivel shaft 22 is provided in a center of the circular recess 21. The circular recess 21 has grooves 21a formed at interval distances at an inner circumferential surface thereof. The swivel shaft 22 is connected with an interface port 23 secured in the stand 20 through a signal cable 24.

The hinge member 30 has a circular body 31 to be inserted into the circular recess 21 and rotated therein, the circular body 31 has a hole 32 formed in a center thereof and protrusions 31a formed at interval distances at an outer circumferential surface thereof. The length of the protrusions 31a is shorter than that of the grooves 21a. Therefore, when the protrusions 31a are engaged with the grooves 21a of the circular recess 21, the circular body 31, i.e., the hinge member 30, can be rotated in the circular recess 21 within a range of a predetermined angle.

Also, when the protrusions 31a are engaged with the grooves 21a of the circular recess 21, the swivel shaft 22 is fitted to the hole 32 provided in the center of the circular body 31.

To both sides of the front portion of the hinge member 30, a pair of hinge brackets 34 are firmly secured by screws 33. Also, tilting shafts 35 extending transversely in opposite directions about one axis are inserted into respective holes provided in a middle portion of the hinge member 30 and firmly secured in the middle portion by screws 33, and a pair of rotating brackets 36 are rotatably supported at respective one ends of the tilting shafts 35, as shown at FIG. 3. Each of the rotating brackets 36 has a plurality of holes 37 which are formed at positions corresponding to the bosses 19 provided at the inner surface of the rear case 12, respectively. A cover 38 fits over the circular body 31.

The reinforcing member 40 has a plurality of thruholes 41 which are formed at positions corresponding to the holes 37 of the rotation brackets 36, and a pair of thruholes 42a respectively provided in both end portions 42 thereof which are formed at positions corresponding to the pair of bosses 17 provided at the inner surface of the rear case 12.

Figure 4:
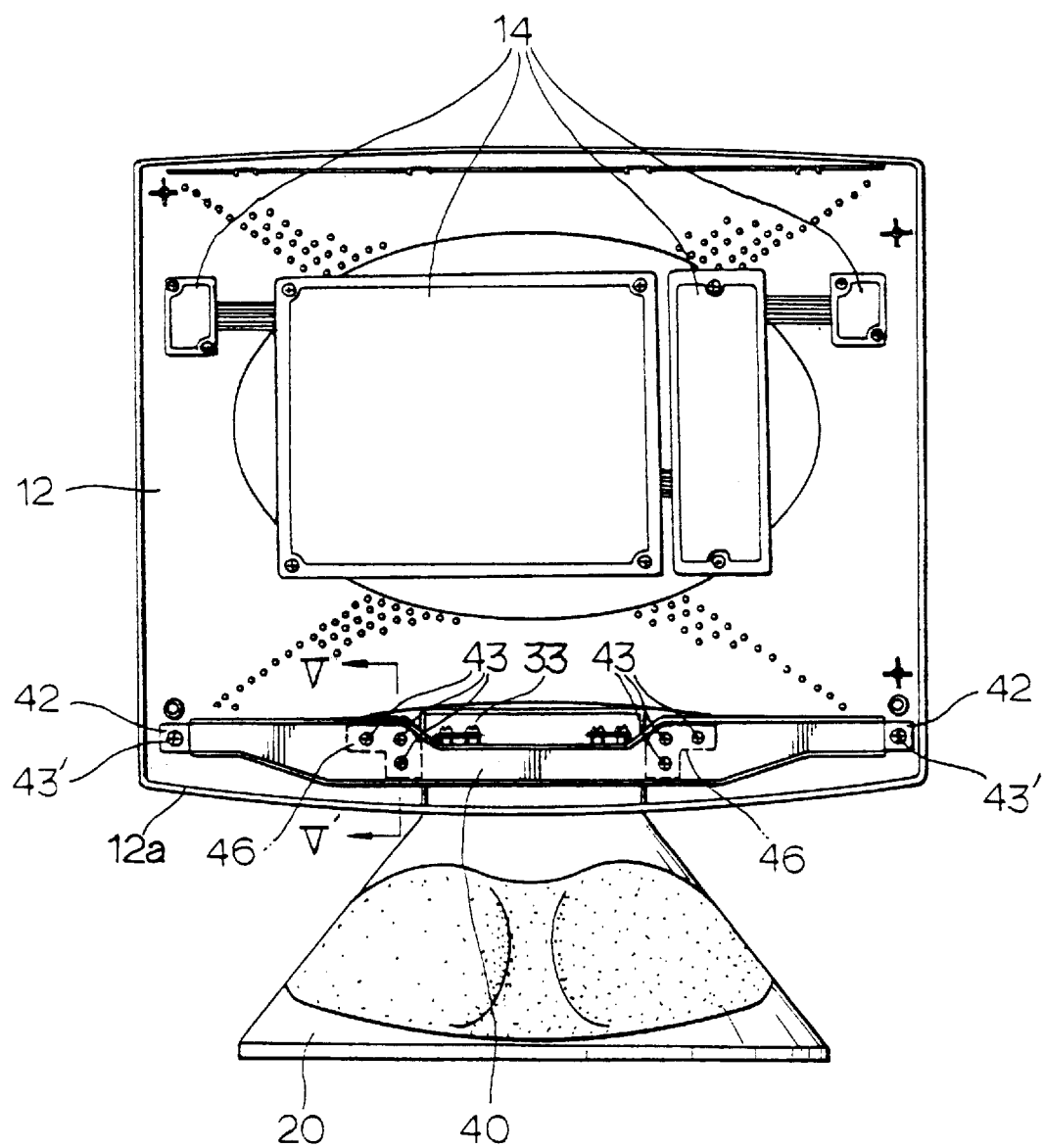
FIG. 4 is a front view showing an assembled state of the parts shown in FIG. 3.
Figure 5:
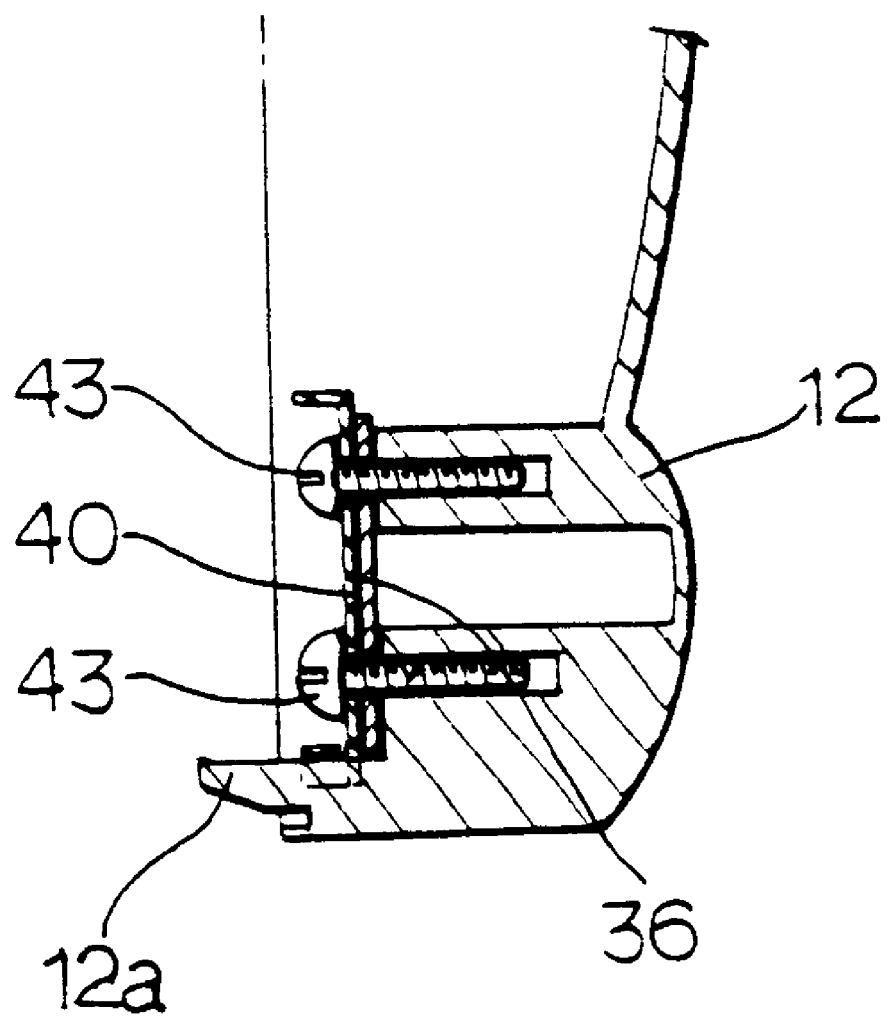
FIG. 5 is an enlarged sectional view taken along a line V–V' of FIG. 4.

The reinforcing member 40 is mounted to the bosses 17 and 19 formed at the lower portion of the inner surface of the rear case 12 by screws 43' and 43, and at the same time, the rotation brackets 36 of the hinge member 30 are also mounted to the bosses 19 by the screws 43, as shown in FIG. 5. The reinforcing bracket 40 preferably has a width and a length shorter than those of a lower side 12a of the rear case 12 such that an edge of the reinforcing bracket 40 does not protrude out of the lower side 12a of the rear case 12 when the reinforcing bracket 40 is assembled into the rear case 12 through the hinge member 30, as shown in FIG. 4.

Now, the assembling process of the flat panel display unit 10 will be described.

First, the circular body 31 of the hinge member 30 is fitted into the circular recess 21 of the stand 20 so that the protrusions 31a of the circular body 31 engage with the grooves 21a of the circular recess 21, by pressing the circular body 31 downwardly. At this time, the swivel shaft 22 positioned in the center of the circular recess 21 is passed through the hole 32 provided in the center of the circular body 31.

Therefore, as above described, since the circular body 31 can be rotated in the circular recess 21 in a range of a certain (predetermined) angle, the hinge member 30 can be rotatably connected to the stand 20 in the range of the certain angle. Herein, the rotation angle is dependent upon the length of the grooves 21a and that of the protrusions 31a.

After the hinge member 30 is rotatably connected to the stand 20 as above described, the reinforcing member 40 is mounted to the bosses 17 and 19 formed at the lower portion of the rear case 12 by screws 43' and 43, and at the same time, the rotation brackets 36 of the hinge member 30 are also mounted to the bosses 19 by the screws 43. The rotation brackets 36 of the hinge member 30 are positioned between the reinforcing member 40 and the bosses 19 and held in place by the screws 43. When the hinge member 30 is mounted to the inner surface of the rear case 12, the circular body 31 is received in a space 18 provided in a central and lower portion inside of the rear case 12.

As known from the above description, the rear case 12 connected with the rotation brackets 36 can be pivoted backwardly and forwardly with respective tilting shafts 35 as a center of rotation, since the rotation brackets 36 are pivotally mounted at a rotating bracket 36 is pivotally mounted at an other end of each tilting shaft 35 extending transversely in a middle portion of the hinge member 30.

As a result, when the display unit 10 is pivoted for adjusting the visual angle thereof, an acting force which is repetitively generated is concentrated upon the bosses 19 to which the rotating brackets 36 are secured and the screws 43 and 43' are not released from the bosses 17 and 19. Since a connecting strength between the display unit 10 and the hinge member 30 is reinforced by reinforcing member 40, rotating brackets 36 remain secured to the rear case 12 because plastic bosses 17 and 19 are not destroyed by repetitive force.

Accordingly, in accordance with this invention, a play does not occur between the bosses and the screws so that the visual angle of the display unit can easily and accurately be adjusted while endurance of the flat panel display device can be enhanced.

What is claimed is:

1. A flat panel display device comprising:
   a display unit having a front case, a rear case, and a flat panel displaying an image;
   a stand to support the display unit and having a circular recess provided at a top portion thereof;
   a hinge member having a tilting shaft, a rotating bracket secured to a lower portion of an inner surface of said rear case of said display unit and pivotable about said tilting shaft as a center of rotation, and a circular body being fitted in said circular recess and rotatable in a range of a certain angle;
   fasteners; and
   a reinforcing member formed separately of said hinge member and secured to the inner surface of said rear case along with said rotating bracket by said fasteners.

2. The flat panel device as claimed in claim 1, wherein:
   said circular body has an outer circumference and a plurality of protrusions formed at said outer circumference; and
   said circular recess has an inner circumference and a plurality of grooves formed at said inner circumference;
   wherein said protrusions are engaged with said grooves, respectively, and a length of said protrusions is shorter than that of said grooves.

3. The flat panel display device as claimed in claim 1, wherein the lower portion of the rear case has a space to receive said circular body.

4. The flat panel display device as claimed in claim 1, wherein said rear case has a lower side and said reinforcing member has a width and a length shorter than those of said lower side of said rear case.

5. The flat panel display device as claimed in claim 2, wherein said rear case has a lower side and said reinforcing member has a width and a length shorter than those of said lower side of said rear case.

6. The flat panel display device as claimed in claim 1, wherein:
said circular body has a hole formed in a center of rotation thereof; and
said circular recess has a swivel shaft formed in a center of said circular recess and extending through said hole, wherein said circular body is rotatable about said swivel shaft.

7. The flat panel display device as claimed in claim 6, wherein said stand further comprises an interface port formed therein, and said swivel shaft is connected to said interface port.

8. The flat panel display device as claimed in claim 2, wherein:
said circular body has a hole formed in a center of rotation thereof; and
said circular recess has a swivel shaft formed in a center of said circular recess and extending through said hole, wherein said circular body is rotatable about said swivel shaft.

9. A flat panel display device comprising:
a display unit having a front case, a rear case, and a flat panel displaying an image;
a stand to support the display unit and having a circular recess provided at a top portion thereof;
a hinge member having a tilting shaft, a rotating bracket secured to a lower portion of an inner surface of said rear case of said display unit and pivotable about said tilting shaft as a center of rotation, and a circular body being fitted in said circular recess and rotatable in a range of a certain angle;
fasteners; and
a reinforcing member secured to the inner surface of said rear case along with said rotating bracket by said fasteners, wherein said reinforcing member extends substantially an entire length of said rear case substantially parallel to said tilting shaft.

10. The flat panel display device as claimed in claim 1, further comprising:
another tilting shaft; and
another rotating bracket secured to the lower portion of the inner surface of said rear case and pivotable about said another tilting shaft as the center of rotation, wherein said rotating bracket and said another rotating bracket are connected to said tilting shaft and said another tilting shaft, respectively.

11. The flat panel display device as claimed in claim 10, wherein:
said reinforcing bracket has a plurality of thruholes;
said rotating bracket and said another rotating bracket each have a plurality of holes;
the lower portion of said inner surface of said rear case has a plurality of bosses; and
said fasteners fit through respective ones of said thruholes of said reinforcing bracket and respective ones of said holes of said rotating bracket or said another rotating bracket and engage corresponding ones of the bosses, in that order.

12. The flat panel display device as claimed in claim 9, further comprising additional fasteners, wherein:
said reinforcing member has endholes at respective ends thereof, wherein the plurality of thruholes are between the endholes;
the lower portion of said inner surface of said rear case has a plurality of another bosses; and
said additional fasteners fit through respective ones of said endholes and engage corresponding ones of the bosses.

13. The flat panel display device as claimed in claim 11, further comprising additional fasteners, wherein:
said reinforcing member has endholes at respective ends thereof, wherein the plurality of thruholes are between the endholes;
the lower portion of said inner surface of said rear case has an another plurality of bosses; and
said additional fasteners fit through respective ones of said endholes and engage corresponding ones of the another bosses.

14. The flat panel display as claimed in claim 12, wherein:
said bosses and another bosses are made of plastic; and
said fasteners and additional fasteners are made of metal.

15. A display device comprising:
a display unit having a front case, a rear case, and a display screen to display information enclosed within said front and rear cases;
a stand to support said display unit on an external surface;
a hinge member to connect said display unit to said stand, and enable rotation of said display unit about a first axis perpendicular to the external surface and a second axis parallel to a surface of said display screen and said external surface, wherein said hinge member is secured to an inner surface of said rear case;
a reinforcing member formed separately of said hinge member; and
fasteners to secure said reinforcing member along with said hinge member to the inner surface of said rear case.

16. The display device as claimed in claim 15, wherein:
said hinge member has holes;
said reinforcing member has thruholes respectively corresponding to the holes of said hinge member; and
said fasteners are screws which pass through said reinforcing member, said hinge member and engage with the inner surface of said rear case.

17. The display device as claimed in claim 15, further comprising additional fasteners to directly secure said reinforcing member to the inner surface of said rear case.

18. The display device as claimed in claim 17, wherein said reinforcing member has endholes at respective end portions thereof; and
said additional fasteners are screws which respectively pass through said endholes and engage with the inner surface of said rear case.

19. The display device as claimed in claim 15, wherein:
said stand has a circular recess; and
said hinge member includes
a pair of tilting shafts extending along the second axis,
a pair of rotating brackets secured to the inner surface of said rear case by said fasteners, connected to respective one ends of said pair of tilting shafts, and pivotable about said respective tilting shafts, and
a circular body fitted within said circular recess and rotatable so as to enable rotation of said display unit about the first axis.

20. The display device as claimed in claim 15, wherein:

said hinge member has holes;

said reinforcing member has thruholes respectively corresponding to the holes of said hinge member and endholes at respective end portions thereof, the holes of said hinge member and the thruholes of said reinforcing member being between the endholes of said reinforcing member; and said fasteners are first screws and second screws, said first screws respectively passing through the thruholes of said reinforcing member and the corresponding thruholes of said hinge member, said second screws respectively passing through the endholes of said reinforcing member, said first screws and said second screws engaging with the inner surface of said rear case.

21. A flat panel display device comprising:

a display unit having a front case, a rear case, and a flat panel displaying an image;

a stand to support the display unit and having a circular recess provided at a top portion thereof;

a hinge member having a tilting shaft, a rotating bracket secured to a lower portion of an inner surface of said rear case of said display unit and pivotable about said tilting shaft as a center of rotation, and a circular body being fitted in said circular recess and rotatable in a range of a certain angle;

fasteners; and a reinforcing member secured to the inner surface of said rear case along with said rotating bracket by said fasteners, wherein said reinforcing member extends substantially an entire length of said rear case.

22. A flat panel display device comprising:

a display unit having a front case, a rear case, and a flat panel displaying an image;

a stand to support the display unit and having a circular recess provided at a top portion thereof;

a hinge member having a tilting shaft, a rotating bracket secured to a lower portion of an inner surface of said rear case of said display unit and pivotable about said tilting shaft as a center of rotation, and a circular body being fitted in said circular recess and rotatable in a range of a certain angle;

fasteners; and a reinforcing member secured to the inner surface of said rear case along with said rotating bracket by said fasteners, wherein said reinforcing member is substantially parallel to said tilting shaft.

23. A flat panel display device comprising:

a display unit having a front case, a rear case, and a flat panel displaying an image;

a stand to support the display unit and having a circular recess provided at a top portion thereof;

a hinge member having a tilting shaft, a rotating bracket secured to a lower portion of an inner surface of said rear case of said display unit and pivotable about said tilting shaft as a center of rotation, and a circular body being fitted in said circular recess and rotatable in a range of a certain angle;

fasteners; and a reinforcing member secured to the inner surface of said rear case along with said rotating bracket by said fasteners, said reinforcing member having a width and a length, said length intermediate of a width of said hinge member and a width of said display unit.

* * * * *